United States Patent [19]
Saeki et al.

[11] Patent Number: 4,824,748
[45] Date of Patent: Apr. 25, 1989

[54] METHOD OF MAKING A COLOR SEPARATION FILTER INCLUDING MONOMOLECULAR FILM LAYERS OF COUPLED DYESTUFF

[75] Inventors: Hideo Saeki; Shigeyuki Uematsu, both of Itami, Japan

[73] Assignee: Mitsubishi Denki Kabushiki Kaisha, Tokyo, Japan

[21] Appl. No.: 158,848

[22] Filed: Feb. 22, 1988

Related U.S. Application Data

[62] Division of Ser. No. 830,131, Feb. 18, 1986, Pat. No. 4,745,327.

[30] Foreign Application Priority Data

May 21, 1985 [JP] Japan ................. 60-109806

[51] Int. Cl.⁴ ............................................. G03F 9/00
[52] U.S. Cl. ....................................... 430/7; 430/24; 430/335
[58] Field of Search .......................... 430/7, 24, 339

[56] References Cited

U.S. PATENT DOCUMENTS 3,104,973  9/1963  Sprague et al. ............... 96/48
3,778,849  1/1974  Taguchi et al. ............... 96/48
4,267,961  5/1988  Martin et al. ................. 250/226
4,416,961  11/1983 Drexhage ....................... 430/7
4,580,159  4/1986  Manabe .......................... 358/44

OTHER PUBLICATIONS

Roberts, "Langmuir–Blodgett Films":, Contemp. Phys., 25(2), pp. 109–128 (1984).
Baker et al, "The Preparation and Properties of Stable Metal-Free Phthalocyanine Langmuir–Blodgett Films", Thin Solid Films, 99, pp. 53–59 (1983).
Broers, "Rapid Writing of Fine Lines in Langmuir–Blodgett Films Using Electron Beams", Thin Solid Films, 99, pp. 325–329 (1983).

Primary Examiner—Won H. Louie
Assistant Examiner—Patrick A. Doody
Attorney, Agent, or Firm—Lowe, Price, LeBlanc Becker & Shur

[57] ABSTRACT

A color separation filter which is formed through use of dyestuffs provided with monomolecular film forming properties in which molecules can be absorbed by air-water interfaces and patterning properties capable of forming patterns through exposure by ionizing radiations. A method of manufacturing a color separation filter which comprises a step of forming monomolecular films of dyestuffs provided with monomolecular film forming properties and patterning properties, a step of piling a plurality of monomolecular films to form cumulative films and a step of patterning the cumulative films by radiating ionizing radiations to the cumulative films.

2 Claims, 5 Drawing Sheets

FIG. 2(a)
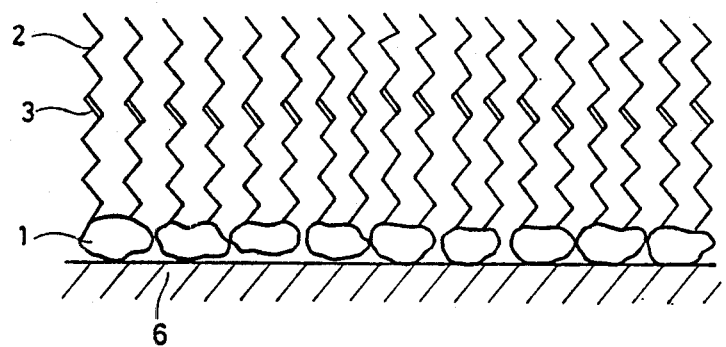
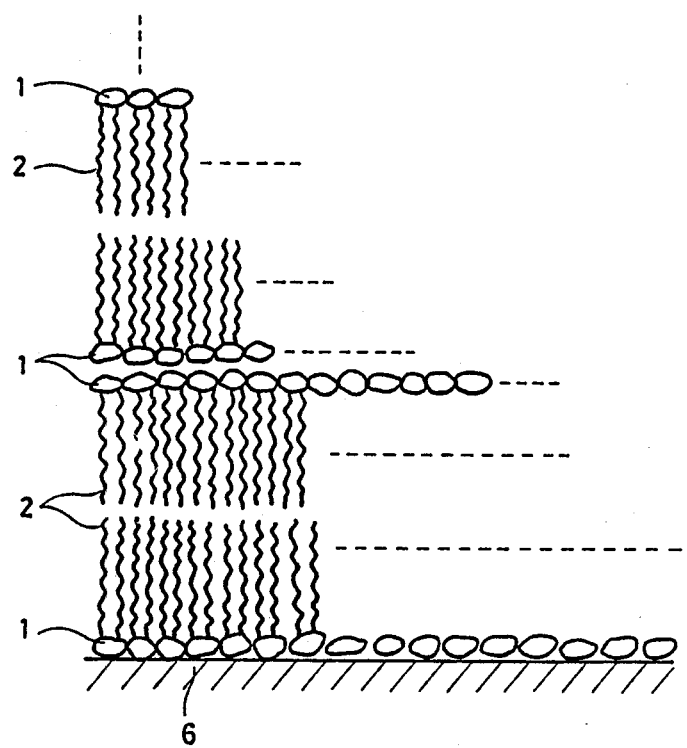
FIG. 2(b)

METHOD OF MAKING A COLOR SEPARATION FILTER INCLUDING MONOMOLECULAR FILM LAYERS OF COUPLED DYESTUFF

This is a division, of application Ser. No. 830,131 now U.S. Pat. No. 4,745,327.

BACKGROUND OF THE INVENTION

1. Field of the Invention

The present invention relates to a color separation filter which is employed in a solid-state image pickup element or an image pickup tube to enable color image pickup and a method of manufacturing the same.

2. Description of the Prior Art

An example of a conventional color separation filter is disclosed in Japanese Patent Publication Gazette No. 17375/1977. FIG. 6 is a sectional view showing the conventional color separation filter. Referring to FIG. 6, a blue color separation filter array 7b is provided in the form of stripes on a substrate 6, which is further provided with a film 8 for preventing mixture of colors to cover the blue color separation filter array 7b. Provided on the color mixture preventing film 8 is a yellow color separation filter array 9b, which is covered by a protective coat 10.

In order to form the respective color separation filter arrays 7b and 9b, materials therefor are generally prepared in desired patterns such as stripes or mosaics to be dyed in desired density by appropriate dyestuffs of, e.g., three primary colors or complementary colors.

Thus, the conventional color separation filter is formed through a step for preparing materials to be dyed in prescribed patterns, a step of applying dyestuffs to the materials by means such as dyeing to color the same and a resist printing step for preventing mixture of colors in application of the dyestuffs of different colors.

In a conventional method of manufacturing the color separation filter, it is necessary to provide materials to be dyed in desired patterns on a prescribed substrate thereby to color the same. In general, the dyed materials, which are prepared by water-soluble high polymers such as gelatin, casein, glue and polyvinyl alcohol are photosensitized by some method to obtain the desired patterns through the so-called photoengraving process. With respect to such dyed materials, however, those excellent in resolution are inferior in dyed property while those excellent in dyed property are inferior in resolution. Such a problem leads to a significant defect for improving the density of unit filters required for increasing resolution of, e.g., an image pickup element thereby to improve the quality of pictorial images reproduced on a TV screen. Further, the conventional method requires a dyeing step for coloring, which step is not well-matched with a process such as that in the semiconductor industry requiring extreme cleanliness.

SUMMARY OF THE INVENTION

The present invention has been proposed to overcome the aforementioned disadvantages of the prior art, and the principal object thereof is to provide a color separation filter of high density and efficiency which is in structure and steps absolutely different from those of the prior art, to obtain a desired filter configuration smaller than several μm in thickness without requiring a dyeing step.

The color separation filter according to the present invention is obtained by employing dyestuffs having monomolecular film forming properties in which molecules can be adsorbed by air-water interfaces and patterning properties by ionizing radiations to form cumulative films of dyestuff molecules on a substrate by the so-called Langmuir-Blodgett method (hereinafter referred to as L-B method) thereby to pattern the same by the so-called photoengraving process employing ionizing radiations such as X-rays, electron beams, molecular beams, ultraviolet rays or far ultraviolet rays.

Dyestuff molecules employed in the present invention are coupled with, in correspondence to either hydrophilic or lipophilic (hydrophobic) properties of chromophores thereof, hydrophilic or lipophilic hydrocarbon chains having functional groups such as double bonds, triple bonds or epoxy groups, which are photosensitive to the ionizing radiations. The hydrocarbon chains have, e.g., 5 to 30 carbon atoms.

Such dyestuff molecules readily form monomolecular films on the water surface by the L-B method, so that the desired substrate such as a glass wafer or a silicon wafer provided with a solid-state image pickup element, to be piled to define cumulative films. Thin films of the dyestuffs thus obtained are exposed and developed to obtain desired filter patterns, and such operation is repeated to form a prescribed color separation filter.

The color separation filter according to the present invention requires no dyeing step which has been required in the method of forming the conventional filter, while the same is extremely thin, i.e., several ten to several thousand Å in thickness to readily form fine film patterns which are smaller than several μm, thereby to cope with high densification. Further, since optical density of the filter depends on the cumulative number of the dyestuff molecules, the optical density can be easily controlled in comparison with the conventional dyeing method, thereby to stabilize efficiency of the filter.

Further, the present invention requires no specific dyeing step, whereby the steps thereof are extremely reduced to prevent generation of defects, leading to remarkable improvement of the yield. In addition, the filter itself is mainly formed by the dyestuff molecules with no inclusion of dyed materials which have been employed in the prior art, whereby the filter is obtained in extremely clear colors to remarkably improve reproducibility of the image pickup element.

These and other objects, features, aspects and advantages of the present invention will become more apparent from the following detailed description of the present invention when taken in conjunction with the

BRIEF DESCRIPTION OF THE DRAWINGS

FIGS. 2 to 4 illustrate steps of a method of manufacturing a color separation filter according to the embodiment of the present invention, in which FIG. 2(a) shows monomolecular films of dyestuff molecules transferred on a substrate, FIG. 2(b) shows dyestuff cumulative films transferred on the substrate while FIG. 3 shows the manner of exposing the dyestuff molecules transferred on the substrate by ionizing radiation and FIG. 4 shows patterns of the dyestuff molecules transferred on the substrate after development;

DESCRIPTION OF THE PREFERRED EMBODIMENT

The L-B method employed in the present invention is described in "Langmuir-Blodgett Films", G. G. Roberts, Contemp. Phys. 25(2) pp. 109–128 (1984). Further, "The Preparation and Properties of Stable Metal-Free Phthalocyanine Langmuir-Blodgett Films", S. Baker, M. C. Petty, G. G. Roberts, M. V. Twigg, Thin Solid Films, 99, pp. 53–59 (1983) discloses formation of films of dyestuffs by the L-B method. In addition, "Rapid Writing of Fine Lines in Langmuir-Blodgett Films Using Electron Beams", A. N. Broers, M. Pomerantz, Thin Solid Films, 99. pp. 323–329 (1983) describes an example of patterning of L-B films by electron beams.

Description is now made on an embodiment of the present invention with reference to the accompanying drawings.

Figure 5:
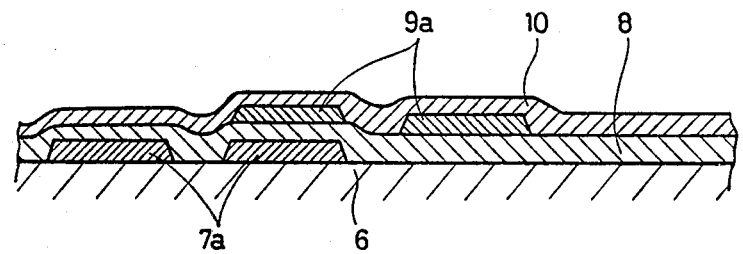
FIG. 5 is a sectional view showing a color separation filter according to the embodiment of the present invention.
Figure 6:
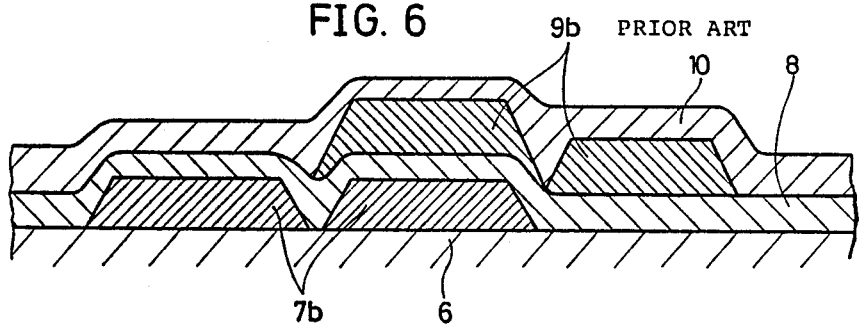
FIG. 6 is a sectional view showing a conventional color separation filter.

FIG. 5 shows a color separation filter according to an embodiment of the present invention. The following description is made for employing water-soluble, i.e., hydrophilic dyestuffs. With respect to lipophilic (hydrophobic) dyestuffs, a similar process is enabled by making corresponding hydrocarbon chains hydrophilic.

Referring to FIG. 5, a blue color separation filter array 7a is formed on a substrate 6 in the form of mosaics or stripes. The substrate 6 is further provided thereon with a film 8 for preventing mixture of colors to cover the blue color separation filter array 7a. The color mixture preventing film 8 is formed by, e.g., a transparent photoresist material. A yellow color separation filter array 9a is formed on the color mixture preventing film 8 in the form of mosaics or stripes. A protective coat 10 is provided on the color mixture preventing film 8 to cover the yellow color separation filter array 9a. The protective coat 10 is also formed by, e.g., a transparent photoresist material. The color separation filter according to the present invention is formed in the aforementioned manner.

The substrate 6 may be formed by a wafer of transparent glass or transparent quartz to obtain a color separation filter which is applied to an image pickup tube or a solid-state image pickup element. Or, the substrate 6 may alternatively be formed by a silicon wafer provided with a solid-state image pickup element, thereby to obtain the so-called surface-mounting type color solid-state image pickup element.

The blue color separation filter array 7a and the yellow color separation filter array 9a are formed through use of dyestuffs provided with monomolecular film forming properties in which molecules are adsorbed by air-water interfaces and patterning properties which can form fine patterns through exposure by ionizing radiations such as X-rays, electron beams, ultraviolet rays or far ultraviolet rays.

Figure 1A:
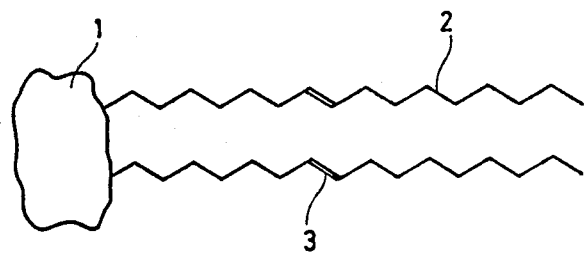
FIG. 1 shows dyestuff molecules which are provided with monomolecular film forming properties and patterning properties to be employed in a color separation filter according to an embodiment of the present invention, (a) showing a dyestuff molecule coupled with hydrocarbon chains having double bonds, (b) showing a dyestuff molecule coupled with hydrocarbon chains having triple bonds and (c) showing a dyestuff molecule coupled with hydrocarbon chains having epoxy groups.
Figure 1B:
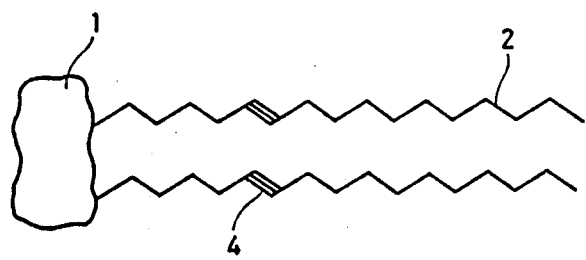
Figure 1C:
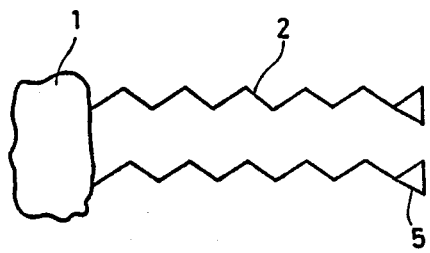

FIG. 1 shows the dyestuffs which are provided with the said monomolecular film forming properties and patterning properties in the following manner: A hydrophilic blue dyestuff molecule 1 is coupled with one or more lipophilic hydrocarbon chains 2 having reaction radicals such as double bonds 3 (FIG. 1(a)), triple bonds 4 (FIG. 1(b)) or epoxy groups 5 (FIG. 1(c)), which are reactive to ionizing radiations 11 such as X-rays, electron beams, ultraviolet rays or far ultraviolet rays.

Although the blue dyestuff molecule 1 is coupled with the straight chains 2 of hydrocarbon, hydrocarbon chains may have aromatic rings or other atomic groups which can provide the dyestuffs with the monomolecular film forming properties and patterning properties, to which the present invention is directed.

Figure 3:
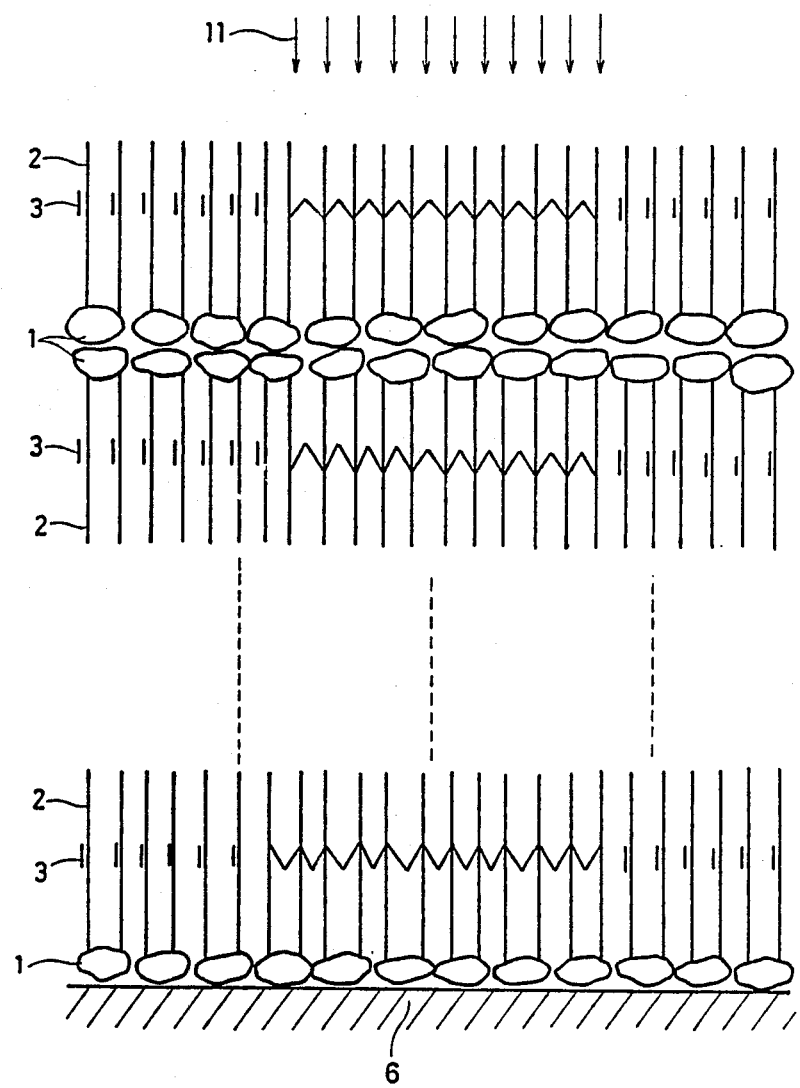
Figure 4:
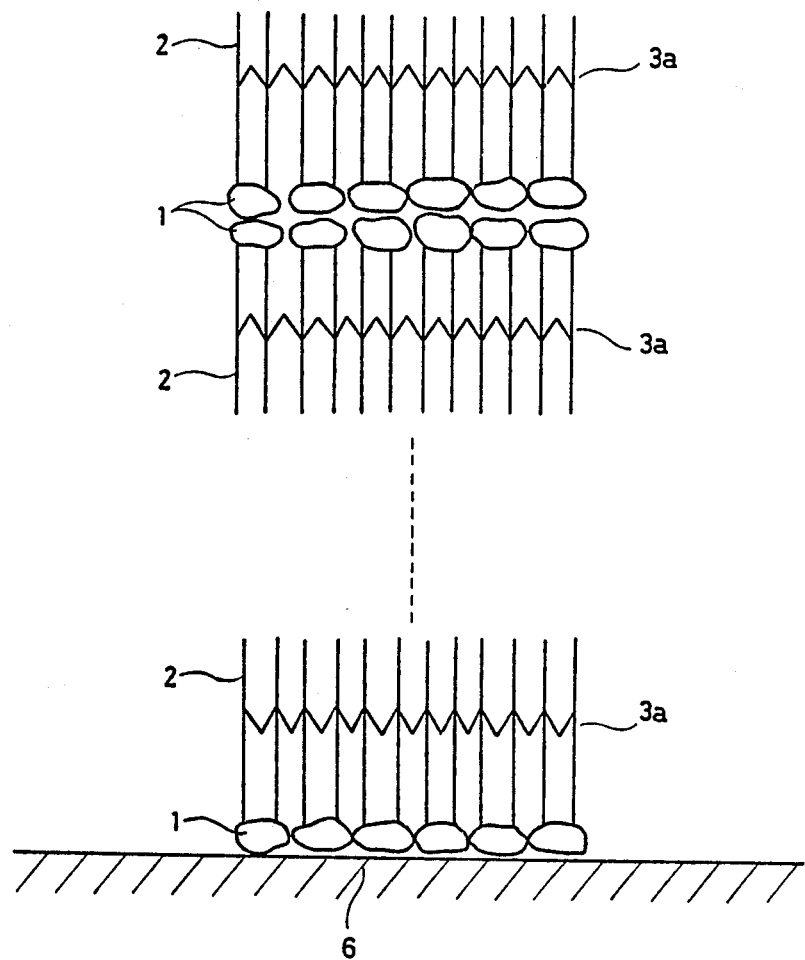

FIGS. 2 to 4 illustrate steps of manufacturing the color separation filter as shown in FIG. 5 by an embodiment of a method according to the present invention. Description is now made on the method according to the present invention with reference to FIGS. 2 to 5.

The dyestuff provided with the aforementioned properties is dissolved in a prescribed concentration in a highly volatile solvent in which the dyestuff is highly soluble. Then a small amount of such solution is dripped in a water vessel to evaporate the solvent, whereby monomolecular films of the dyestuff molecules are formed on the water surface according to the L-B method. Then a substrate 6, which is previously dipped in the water, is lifted at a prescribed speed by a lifting device, whereby the monomolecular layers are transferred onto the substrate 6 as shown at FIG. 2(a), to form monomolecular films in which the dyestuff molecules are regularly arrayed. Although the dyestuff molecules 1 as shown at FIG. 2(a) have only double bonds 3, those having other functional groups can be transferred in a similar manner to the above:

The monomolecular films are piled (accumulated) by repeating vertical movement of the substrate 6, such accumulation being performed as shown at FIG. 2(b) to obtain the desired optical density.

The dyestuff cumulative films thus obtained are then dried to be exposed by ionizing radiations 11 in portions for forming a color separation filter array, as shown in FIG. 3. The exposed films are then developed to provide a desired blue color separation filter array 7a formed by portions 3a crosslinked by the exposure, as shown in FIG. 4.

Then, as shown in FIG. 5, a color mixture preventing film 8 is formed on the blue color separation filter array 7a by, e.g., a transparent photoresist material, followed by formation of cumulative films of yellow dyestuff molecules provided with the monomolecular film forming properties and patterning properties in a similar manner to the above. The color mixture preventing film 8 can be omitted by appropriately selecting process conditions. The cumulative films of the yellow dyestuff molecules are exposed by the ionizing radiations 11 to form a yellow color separation filter array 9b in a similar manner to the blue color separation filter array 7a. A green color separation filter array is defined by overlapped portions of the blue and yellow color separation filter arrays 7a and 9b. After the yellow color separation filter array 9b is formed, a protective coat 10 is formed by a transparent photoresist material etc. thereby to provide the color separation filter for a color image pickup element.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a color separation filter comprising a step of forming monomolecular films through use of dyestuffs provided with monomolecular film forming properties in which molecules can be adsorbed by air-water interfaces and patterning properties capable of forming patterns through exposure by ionizing radiations, a step of piling a plurality of said monomolecular films radiating said ionizing radiations on said cumulative films for patterning the same.

2. A method of manufacturing a color separation filter in accordance with claim 1, wherein X-rays, electron beams, molecular beams, ultraviolet rays or far ultraviolet rays are employed as said ionizing radiations.

* * * * *